United States Patent [19]

Kato

[11] Patent Number: 4,699,799

[45] Date of Patent: Oct. 13, 1987

[54] METHOD FOR FORMING A DEPOSITION FILM

[75] Inventor: Minoru Kato, Kawasaki, Japan

[73] Assignee: Canon Kabushiki Kaisha, Tokyo, Japan

[21] Appl. No.: 936,962

[22] Filed: Dec. 1, 1986

Related U.S. Application Data

[63] Continuation of Ser. No. 798,138, Nov. 14, 1985, abandoned, which is a continuation of Ser. No. 659,176, Oct. 9, 1984, abandoned.

[30] Foreign Application Priority Data

Oct. 17, 1983 [JP] Japan ................................ 58-192569

[51] Int. Cl.$^4$ .............................................. B05D 3/06
[52] U.S. Cl. ........................................ 427/37; 427/39; 427/300
[58] Field of Search ............................ 427/37, 39, 300

[56] References Cited

U.S. PATENT DOCUMENTS 4,438,188  3/1984  Shimatani et al. ................ 427/39 X
4,446,168  5/1984  Kato et al. ............................ 427/39
4,452,828  6/1984  Namba et al. ......................... 427/39

Primary Examiner—Bernard D. Pianalto
Attorney, Agent, or Firm—Fitzpatrick, Cella, Harper & Scinto

[57] ABSTRACT

A method for forming a deposition film by introducing a source gas into a reduced pressure deposition chamber, establishing an electric field across opposing electrode to cause discharge in the deposition chamber, and decomposing or polymerizing the source gas by a discharge energy or the discharge energy and a thermal energy to form the deposition film on a substrate disposed in the deposition chamber, characterized by that an auxiliary substrate is provided in adjacent to the substrate.

8 Claims, 1 Drawing Figure

METHOD FOR FORMING A DEPOSITION FILM

This application is a continuation of application Ser. No. 798,138 filed Nov. 14, 1985, which in turn is a continuation of Ser. No. 659,176 filed Oct. 9, 1984, both are now abandoned.

BACKGROUND OF THE INVENTION

1. Field of the Invention

The present invention relates to a method for forming a deposition film such as a photoconductive film, a semiconductive film, an inorganic insulative film or an organic resin film by discharge under a reduced pressure.

2. Description of the Prior Art

In a method for forming a deposition film having a desired characteristic on a desired substrate by introducing a deposition film forming gas (source gas) into a reduced pressure chamber (deposition chamber) and depositing the film by utilizing a plasma phenomenon by discharge, it is inevitable that a certain directivity appears in a plasma reaction because of necessity of the application of an electric field in conducting the process. As a result, it is very difficult to maintain a uniform discharge intensity over a vicinity of the substrate and hence it is very difficult to form a deposition film having a uniform composition and a uniform thickness over the entire substrate.

For example, a technique for decomposing silane ($SiH_4$) gas by discharging to form a hydrogenated amorphous silicon (a-Si:H) film on a heated substrate in order to utilize it in various photoelectric conversion devices or electronic devices has been reported. For the a-Si:H film having a structure-sensitive and semiconductive property, the ununiformity of the film composition sensitivity appears as variations in electrical, optical andf physical characteristics and hence it is a serious problem. When the a-Si:H film is used as an electrophotographic photoconductor, it is usually deposited to a high thickness over a large area of a cylindrical substrate. Accordingly, the problem is more serious. Since the film compositions and the film thicknesses of the films deposited at the periphery and center of the cylindrical substrate are usually non-uniform, a deterioration of an image, such as a defect or non-uniformity in density frequently occurs.

SUMMARY OF THE INVENTION

It is an object of the present invention to provide a method for forming a deposition film having a uniform quality and an excellent characteristic.

It is another object of the present invention to provide a method for forming a deposition film by introducing a source gas into a deposition chamber, establishing an electric field across opposing electrodes to cause discharge in the deposition chamber, and decomposing or polymerizing the source gas by a discharge energy or the discharge energy and a thermal energy to form the deposition film on a substrate disposed in the deposition chamber, characterized by the provision of an auxiliary substrate adjacent to the substrate.

By the provision of the auxiliary substrate, the non-uniform discharge strength areas at the ends of the substrate can be moved away to points of non-impact to the substrate so that the deposition film can be formed on the substrate in the stable discharge area and a uniform film composition and a uniform film thickness are obtained over the entire substrate.

DETAILED DESCRIPTION ON THE PREFERRED EMBODIMENT

Figure 1:
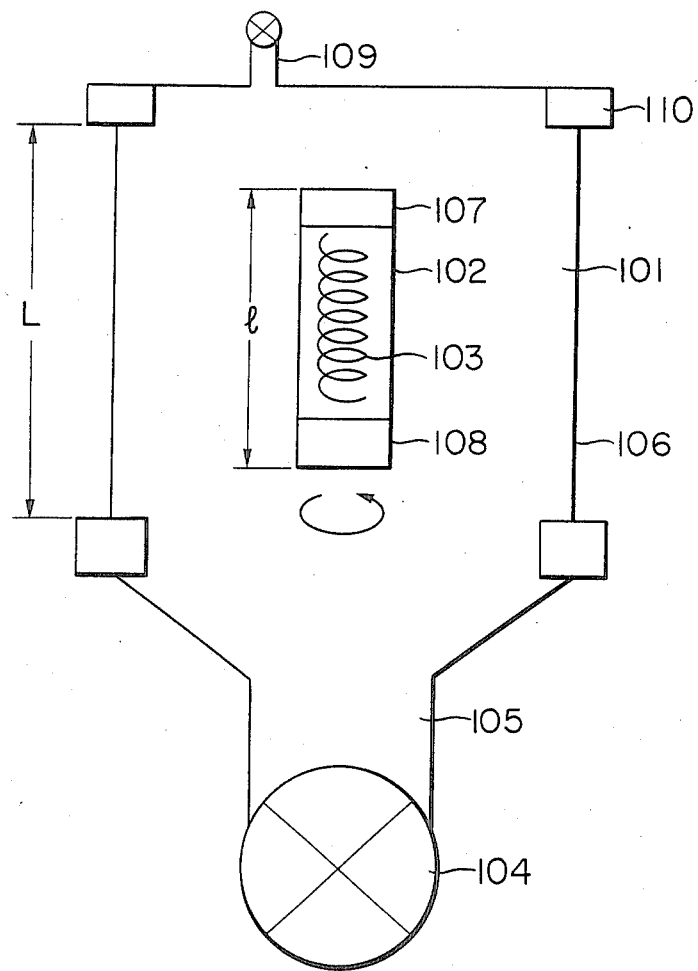
FIG. 1 is a longitudinal sectional view of an apparatus for embodying the method of the present invention.

In the present invention, it is essential to provide at least one pair of electrodes but no other special requirement is necessary and a conventional method for forming a deposition film by discharge may be used. For example, the electrodes may share a deposition chamber or a substrate, or they may be separately provided in the deposition chamber. One of the opposing electrodes may be external of the deposition chamber. Shape may be cylindrical, disc or planar. A virtual plane parallel to the surface of the substrate may be set and several rod-like electrodes may be arranged in the virtual plane at an equal interval in parallel to the substrate. It is not necessary that the substrate and the electrodes are parallel but it is preferable in order to attain a uniform discharge strength and a uniform film thickness. Glow discharge or arc discharge is preferable in the present invention.

The substrate used in the present invention is not limited and any material and any shape may be used depending on the purpose of use. The shape may be cylindrical or planar, and the material may be conductive material such as NiCr, stainless steel, Al, Cr, Mo, Au, Nb, Ta, V, Ti, Pt or Pd, insulative material such as polyester, polyethylene, polycarbonate, cellulose acetate, polypropyrene, polyvinyl chloride, polyvinylidene polystyrene, glass, ceramics or paper, or an insulative material coated with the conductive material.

It is essential that the auxiliary substrate in the present invention is provided adjacent to the substrate, and it is preferably removable. The material and the shape of the auxiliary substrate do not necessarily coincide with those of the substrate but they are preferably similar to those of the substrate. Surfaces of the substrate and the auxiliary substrate facing the electrodes opposite to the substrate and the auxiliary substrate are preferably on the same plane. When a cylindrical substrate is used, it is preferable that the diameter of the auxiliary substrate is essentially equal to that of the substrate. In order to prevent non-uniformity of the film thickness and the film composition of the deposition film due to non-uniformity in the discharge at the ends of the electrode, which causes a problem particularly when the substrate shares the electrode, it is preferable to set an area ratio of the surfaces of the substrate and the auxiliary substrate contributing to the discharge to 1/0.02–2. If the auxiliary substrate is too large, the size of the apparatus increases, cost increases accordingly and mass productivity is lowered. On the other hand if the substrate is too small, the substrate is affected by the nonuniform discharge strength area and hence a deposition film of uniform film composition and uniform film thickness cannot be formed. From the above consideration, it is preferable that the area ratio of the surfaces of the substrate and the auxiliary substrate is in the range of 1/0.02–2.

In order to attain more stable discharge, it is preferable that a length l of an assemble of the substrate and the auxiliary substrate is shorter than a length L of the opposing electrode. The assembly of the substrate and the auxiliary substrate is arranged at the center of the space surrounded by an outer electrode such that the film forming surface of the assembly is at an equi-distance from the electrode surface.

The substrate and the auxiliary substrate may be jointed by joint means such as wire, adhesive material, screws or band or by direct joint by forming threads in the substrate and the auxiliary substrate. Any appropriate means may be selected depending on the shape and the material of the substrate and the auxiliary substrate, the necessity of removal, heating condition, share with the electrode, and other deposition film forming conditions. Depending on the material of the auxiliary substrate and the joint method, the auxiliary substrate may be repetitively used but it is preferable not to repetitively use the auxiliary substrate as it may contaminate of the deposition film.

The present method is now explained in detail with reference to the drawing. While the method for forming an a-Si:H film is particularly explained below, the present invention is not limited to the method for forming the a-Si:H film but it may be applied to any method for decomposing or polymerizing the source gas for forming the deposition film by a discharge energy or the discharge energy and a thermal energy.

EXAMPLE

FIG. 1 shows an embodiment of an apparatus for implementing the present method although it is not restrictive.

Numeral 101 denotes a deposition chamber. Arranged in the deposition chamber 101 are a cylindrical substrate 102 which also acts as an anode electrode for forming a deposition film, and a substrate heater 103 for heating the substrate 102. An opening 105 is provided below the deposition chamber 101 so that the interior of the deposition chamber 101 is evacuated to a predetermined degree of vacuum by an evacuation device (not shown) when a main valve 104 is opened. A cathode electrode 106 is provided as an inner wall of the deposition chamber 101 to allow discharge between the substrate 102 and the cathode electrode 106.

In the illustrated apparatus, the substrate 101 is grounded and rotated to unify the film thickness and the film composition. Auxiliary substrates 107 and 108 arranged above and below the substrate 101 are made of aluminum and an area ratio of the substrate 102 and each of the auxiliary substrates 107 and 108 facing the cathode electrode 106 is set to 1/0.3.

The cathode electrode 106 is connected to an R.F. power supply through a matching circuit, not shown. A gas conduit 109 for introducing source gas is connected to an R.F. power supply through a matching circuit, not shown. A gas conduit 109 for introducing source gas is connected to a top of the deposition chamber 101 so that several different gases are introduced as required. The substrate 102 and the auxiliary substrates 107 and 108 are previously heated to a predetermined proper temperature by the substrate heater 103. For the a-Si:H film, a substrate temperature of 200° C.–400° C. is appropriate. In the present example, it is set to 250° C.

A gas mixture consisting of 5–40% by volume of SiH$_4$ and 95–60% by volume of H$_2$ is introduced into the deposition chamber 101 at a gas pressure of 0.1–0.2 Torr and a gas flow rate of 0.1–2 l/min, and the a-Si:H film is formed on the assembly of the substrate 102 and the auxiliary substrates 107 and 108 at a discharge power of 100 watts. The above step is repeated to form the a-Si:H films on several assemblies. The a-Si:H films thus formed on the substrates 102 are removed from the auxiliary substrates 107 and 108 and measured by an eddy current method. The film thickness distribution was within ±2% over the entire substrate area. The substrate 102 having the a-Si:H film formed thereon, that is, the a-Si:H drum, was set in a copying machine for evaluation of image quality. A high quality of image free from non-uniformity in density and image defect was produced over the entire drum area.

While the cylindrical substrate is used in the present example, the same is true for a planar substrate. In addition to the a-Si:H film, a-SiN$_x$H$_{1-x}$ ($0<x\leq 1$), a-SiO$_x$H$_{1-x}$ ($0<x\leq 1$), a-SiC$_x$H$_{1-x}$ ($0<x\leq 1$), a-SiN, a-SiO and a-SiC deposition film may be formed. When the deposition film is to be formed by polymerization, the source gas is changed to styrene monomer gas or styrene dimer gas.

The advantage of the present invention is explained by referring to a comparative example.

COMPARATIVE EXAMPLE

An a-SiH film was formed and evaluated under the same condition as that of the above example except for the removal of the upper and lower auxiliary substrates 107 and 108. The film thickness distribution was ±10% and non-uniformity in the density was observed between the edge areas and the center area. The non-uniformity in the density could not be resolved in spite of the effort to optimize the imaging condition of the copying machine.

As described hereinabove, according to the present invention, the auxiliary substrate is provided adjacent to the substrate so that the ununiform discharge strength areas at the ends of the substrate are moved away from a region which affects the substrate. Accordingly, a deposition film having uniform film thickness and uniform film composition can be formed.

What is claimed is:

1. A method for forming a deposition film by introducing source gas into a reduced pressure deposition chamber, establishing an electric field across opposing electrodes to cause discharge in said deposition chamber, and decomposing or polymerizing said source gas by a discharge energy or the discharge energy and a thermal energy to form the deposition film on a substrate disposed in said deposition chamber, wherein an auxiliary substrate is provided adjacent to said substrate, a material of said auxiliary substrate is similar to that of said substrate an area ratio of surfaces of said substrate and said auxiliary substrate contributing to the discharge is from 1/0.02 to $\frac{1}{2}$, the temperature of said substrate is maintained between 200 to 400° C. during the deposition, said source gas comprises 5 to 40 volume percent SiH$_4$, the pressure of said gas is from 0.1 to 0.2 Torr, and the flow rate of said source gas is 0.1 to 2 liters/minute.

2. A method for forming a deposition film according to claim 1 wherein a shape of said auxiliary substrate is similar to that of said substrate.

3. A method for forming a deposition film according to claim 1 wherein an assembly of said substrate and said auxiliary substrate serves as one of said opposing electrodes.

4. A method for forming a deposition film according to claim 3 wherein one of said opposing electrodes is located externally of said deposition chamber.

5. A method for forming a deposition film according to claim 3 wherein both of said opposing electrodes are inside of said deposition chamber.

6. A method for forming a deposition film according to claim 1 wherein said substrate is cylindrical.

7. A method for forming a deposition film according to claim 1 wherein one of said opposing electrodes is located externally of said deposition chamber.

8. A method for forming a deposition film according to claim 1 wherein both of said opposing electrodes are inside of said deposition chamber.

* * * * *